United States Patent [19]

Giroir et al.

[11] Patent Number: 4,980,852

[45] Date of Patent: Dec. 25, 1990

[54] NON-LOCKING QUEUEING MECHANISM FOR ENABLING A RECEIVER DEVICE TO READ FROM A QUEUE WITHOUT ACCESS SYNCHRONIZATION WITH A SENDING DEVICE

[75] Inventors: Didier F. Giroir, Antibes; Alvin P. Mullery, Cagnes-Sur-Mer; Andre Pauporte, La Colle Sur Loup, all of France

[73] Assignee: International Business Machines Corporation, Armonk, N.Y.

[21] Appl. No.: 139,873

[22] Filed: Dec. 29, 1987

[30] Foreign Application Priority Data

Dec. 30, 1986 [EP] European Pat. Off. ........... 86430058

[51] Int. Cl.$^5$ ..................... G06F 12/02; G06F 13/12; G06F 5/06

[52] U.S. Cl. ............................... 364/900; 364/927.92; 364/931.4; 364/931.46; 364/933; 364/933.6; 364/940; 364/940.9; 364/940.62; 364/965; 364/926.1; 364/926.3; 364/926.92; 364/931.1; 364/931.48; 364/932.8; 364/933.2; 364/934; 364/934.2; 364/935.43; 364/939

[58] Field of Search ... 364/200 MS File, 900 MS File

[56] References Cited

U.S. PATENT DOCUMENTS

| | | | |
|---|---|---|---|
| 4,040,027 | 8/1977 | van Es et al. | 364/900 |
| 4,402,046 | 8/1983 | Cox et al. | 364/200 |
| 4,783,730 | 11/1988 | Fischer | 364/200 |
| 4,794,521 | 12/1988 | Ziegler et al. | 364/200 |

FOREIGN PATENT DOCUMENTS 8400835  3/1984  World Int. Prop. O.

OTHER PUBLICATIONS

IBM Technical Disclosure Bulletin, vol. 15, No. 8, Jan. 1973, pp. 2495-2496, L. B. Baumer, Read-Only Memory Controlled Buffering.

Primary Examiner—Archie E. Wiliams, Jr.
Assistant Examiner—George C. Pappas
Attorney, Agent, or Firm—Edward H. Duffield

[57] ABSTRACT

A non-locking queueing mechanism is described for transferring information from a sending unit to a receiving unit through a queue in which there is no interference between the independent units (sender and receiver) during enqueueing or dequeueing. The invention thus avoids any form of interlock or serialism. The mechanism includes a first pointer (D), identifying the element area in the queueing device where the last dequeued information element, if any, was located, and a second pointer register for logging a second pointer (E) identifying the element area in the queueing device where the last enqueued information element, if any, was located, a first control block activated by the sending unit to enqueue the information element into the queueing device and for updating the second pointer, and a second control block activated by the recieving unit to dequeue the information element from the queueing device and for updating the first pointer.

7 Claims, 13 Drawing Sheets

DEQUEUE PROCESS

FIG. 4

ENQUEUE PROCESS

FIG. 11  MULTIPLE LEVELS OF PRIORITY

NON-LOCKING QUEUEING MECHANISM FOR ENABLING A RECEIVER DEVICE TO READ FROM A QUEUE WITHOUT ACCESS SYNCHRONIZATION WITH A SENDING DEVICE

TECHNICAL FIELD

This invention relates to digital communication systems and in particular, to a queuing mechanism enabling a receiver device to be decoupled from a sending device.

BACKGROUND OF THE INVENTION

Prior Art

Most communications between independent hardware components of a computer installation (from very simple units to sophisticated processing systems) takes place by a complex protocol insuring that the sending and receiving hardware components are synchronized. A channel is an example of such a communication means. This need for synchronization means that the receiving component must interrupt the work that it is performing, often at great cost to save and restore the status of the work.

A better alternative is to have some form of queuing mechanism for enabling the receiver to be decoupled from the sender. With a queue, a sender can transmit the data to the receiver's queue (enqueue) while the receiving hardware continues to do its normal function. At its own convenience, the receiving hardware can actually receive (dequeue) the transmitted data. Since the sending and receiving hardware components are independent entities capable of acting in parallel, and since the queue is, in effect, a shared resource, a lock normally is necessary to prevent the sender and receiver from interfering with each other during the enqueue and dequeue. This reduces the level of parallelism and the performance and also increases the complexity and the amount of information to be exchanged.

Generally, the lock between units, say A and B is implemented either:
- explicitly, via Test And Set or Compare And Swap instructions if both A and B units are processors, (or any other kind of hardware or software implementation of semaphores), to allow either A or B to monopolize the queue during an enqueue or a dequeue manipulation, or
- implicitly, if both units use a single "Queue Manipulation Hardware" whose purpose is execute the enqueue and dequeue commands received from the units. Since this mechanism can execute only one command at a time, a serialism is performed. The lock is then implicitly implemented via this form of serialism.

U.S. Pat. No. 4,507,760 shows a FIFO memory configuration in which the lock is explicitly implemented. When both writing information into the FIFO queue and reading information from the FIFO queue are requested, a control circuit 26 gives priority to the write operation which eventually locks the communication between the queue and the receiving device.

SUMMARY OF THE INVENTION

In accordance with the illustrative embodiments of the present invention, a special queuing and dequeueing mechanism is disclosed in which there is no interference between the independent hardware entities (sender and receiver) while enqueueing or dequeueing and even in the generation and propagation of status signals when needed. Therefore, for the mechanism presently disclosed, no interlocking (implicit or explicit) is required.

The invention involves a storage device which can be random access memory for storing N work elements (WE) where N is an integer. The control of the memory uses two pointer registers E and D. The D pointer points to the last WE dequeued from the queue. The E pointer points to the last WE enqueued in this queue.

When information is to be entered in storage for enqueueing, a test is performed to check whether the queue is full or not. In the latter case, the WE is stored in storage at the address INCR(E) and E pointer is incremented where INCR points to the location logically following that pointed to by E.

When a WE is to be read from the queue, a test is effected to ensure that the queue is not empty. In this case a WE is dequeued from address INCR (D) in the storage and D pointer is incremented.

The manipulation of the queue is performed by two independent mechanisms, a first one being in charge of the enqueue process and the second being in charge of the dequeueing process. The first unit performs READ operations in the storage at addresses A(E), A(D) and WRITE operations at addresses INCR(E) and A(E) (where A(E) and A(D) stand for the address of pointers E and D in the storage). The second unit performs READ operations in the storage at addresses A(E), A(D) and INCR(D) and a write operation at address A(D).

The manner of accessing those locations is such that no interference between the enqueueing and dequeueing operations is possible and each communicating entity can access the queue independently of the other entity.

BRIEF DESCRIPTION OF THE DRAWINGS

FIG. 7, consisting of FIGS. 7A and 7B, describes with details the first illustrative embodiment of the invention;

FIG. 9, consisting of FIGS. 9A and 9B, is a second illustrative embodiment of the invention;

DESCRIPTION OF THE INVENTION

Figure 1:
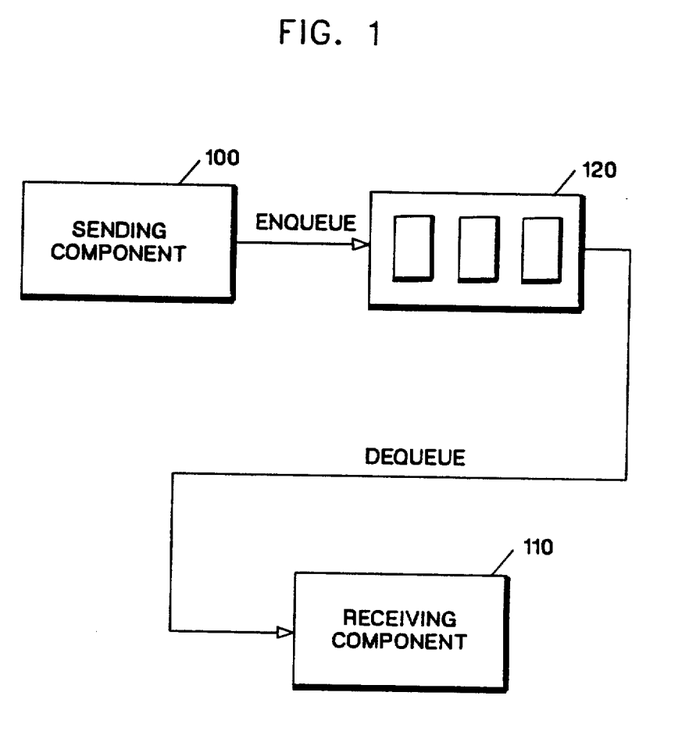
FIG. 1 shows the general principle of a cyclic queue mechanism.

Referring to FIG. 1, the general principle of a queueing mechanism is shown. Queue 120 is defined as a finite set of connected locations wrapping around from head to tail. Work element (WE) size depends on the amount of information to be transferred in that path. The queue may be implemented by making the locations physically consecutive or by using a pointer in each location to indicate the address of the next location of the queue. The actual number of locations assigned to a queue can be set depending upon the expected maximum usage, to avoid reaching a full queue, or the number of locations can be varied according to changing requirements by a monitoring function. Such locations could be mapped into 1 to N bytes of storage or 1 to N registers.

Each component, the sending component 100 and receiving component 110 manipulates queue 120 by means of enqueue (sending component) and dequeue (receiving component) functions.

The queue is based upon the use of a memory with a capacity for storing N work elements WE, where N is an integer. Two pointers are defined to manage the memory.

A D pointer which points to the last WE dequeued from the queue and an E pointer which points to the last WE enqueued in the queue.

These pointers define the "active" portion of the queue - the part that contains the actual queued data. Note that these pointers must obey exactly these rules in order to enable the non-locking algorithm to work. Normal queue mechanisms usually have these pointers specifying the current work element to enqueue or dequeue.

Figure 2:
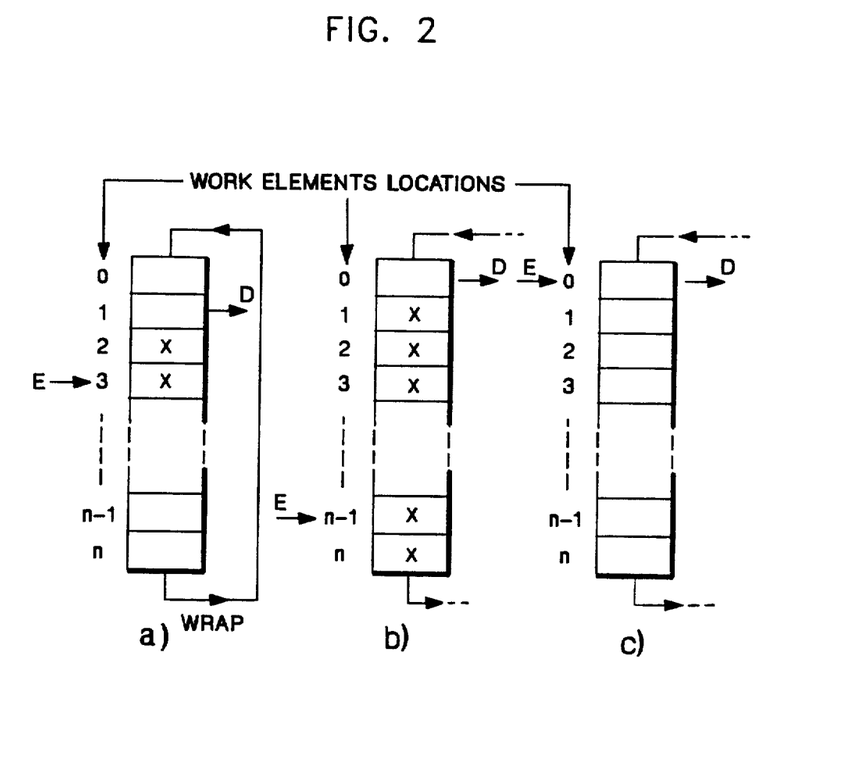
FIG. 2. consisting of views 2A, 2B, 2C shows the different states of a cyclic queue located in memory.

FIGS. 2A, 2B and 2C show the 3 possible states of queue 120.

FIG. 2A shows a queue in a normal state: room is available in the queue.

FIG. 2B describes a queue having a "FULL" state. All requested "enqueue" commands are to be refused.

FIG. 2C describes a queue having an "empty" state.

The different states can be distinguished by the following criteria:
when E=D the queue is in an empty state
when INCR(E)=D the queue is "full"
where INCR(E)=E+1(module N).

When none of the preceding relations are true the queue is in a "normal" state, that is to say that a WE can be dequeued or a new WE can be enqueued.

The INCR operator obeys the following algorithm :
INCR is triggered with a pointer value holding the address of a queue location. When the operator completes, the pointer is updated with the address of the logically following location of the queue.

In case of a linked set of locations, the linked-to pointer is returned.

In the case of a set of physically consecutive locations, the consecutive location is returned except in case of wrap around. In that case, the address of the first location in the queue is returned.

Figure 3:
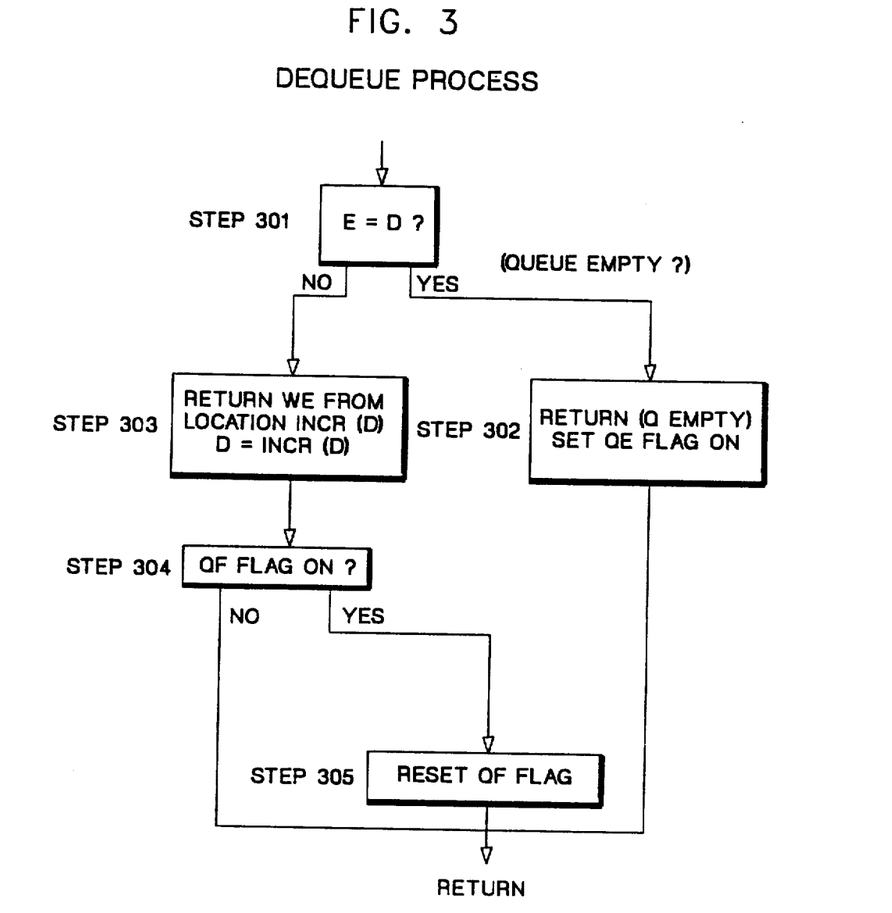
FIG. 3 is a flowchart of the steps involved in processing a dequeue operation.

With respect to FIG. 3, a flow chart is shown describing the steps involved to process a dequeueing operation. Step 301 is performed by receiver component 110 to check whether the queue is empty or not. In case the queue is empty, the dequeue is rejected and a flag QE (waiting on queue empty) is set to warn the receiver of the status of the queue (step 302). If the queue is not empty, a work element WE is returned to the receiver and the pointer D is updated via the INCR operator, (step 303). Then, (step 304) a QF flag (queue full) is tested to determine whether the queue was full before the dequeueing process. In the case QF is ON, the flag is reset (step 305). QF and QE can be used to provide a signalling function and therefore permit the sending-/receiving component to suspend enqueue/dequeue when a full/empty condition has been detected.

Figure 4:
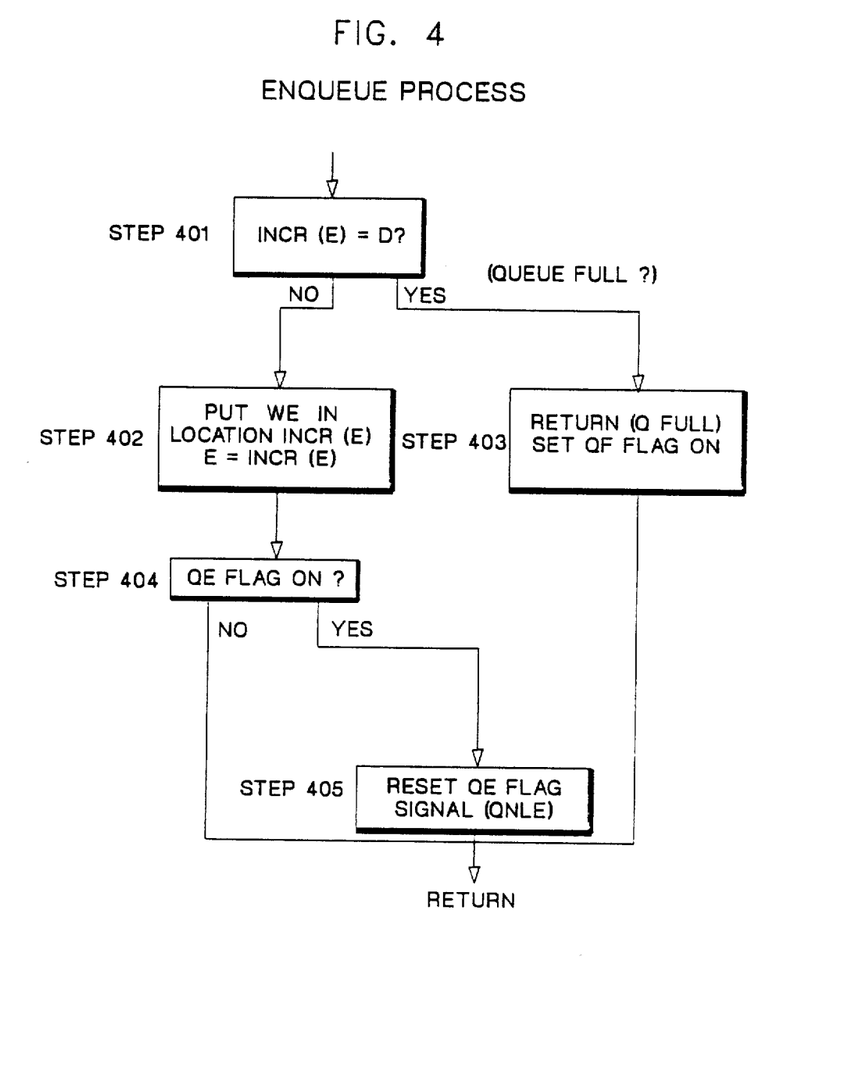
FIG. 4 is a flowchart of the steps involved in processing an enqueue operation.

Referring to FIG. 4, a flow chart is shown describing the steps involved in the process of an enqueueing operation. Step 401 is performed by the sender 100 to check whether the queue is in full state or not. In case the queue is full, the enqueue is rejected and flag QF (queue full) is set to warn the sender of the status of the queue (step 402). If the queue is not full, a WE is placed in its location and the pointer is updated (step 403). Then, (step 404) the queue is tested to detect if the receiver is waiting for a transition from empty to non-empty state. In case of such a transition, flag QE is reset to inform the receiver 110 (step 405).

Figure 5:
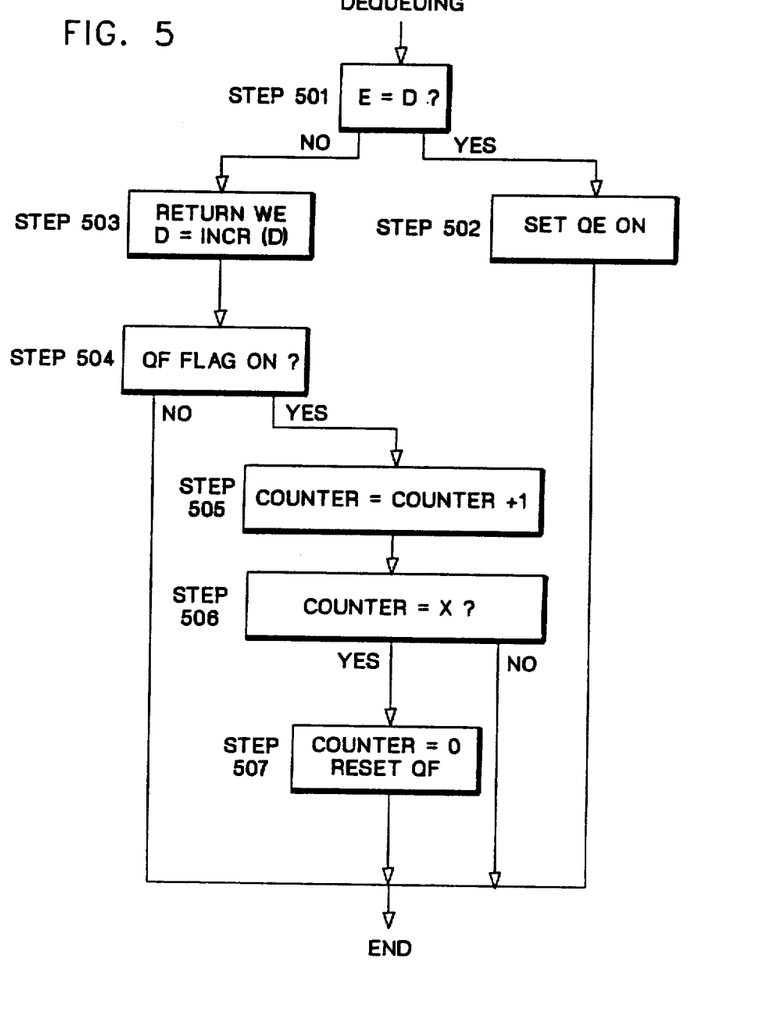
FIG. 5 is a flowchart of a dequeue operation including a hysteresis function.

Optionally, in case the enqueueing of work elements by the sender is faster than the dequeueing by the receiver, the queue can be constantly swapping from full to non-full states. This constant swapping can be avoided by applying a hysteresis as shown in FIG. 5 in which the solution to avoid the signalling until a predefined number (X) of dequeues have been made by the receiver. This value X could be dynamically controlled by the receiver, because this component has the knowledge of the amount of signals received from the sender. The value of X can be selected as a compromise between the amount of signalling performed and the time work elements may wait without being serviced as a result of the signalling delay.

Steps 501, 502 and 503 are respectively identical to steps 301, 302 and 303 of FIG. 3. In step 504, the status of the QF flag is tested. When the QF flag is OFF, the dequeueing process is completed. When the QF flag is on, the process goes on with step 505 which increments a counter. Then, (step 506) the value of that counter is tested to determine whether a predefined number (X) of sequences have been performed by the receiver since the "full" status of the queue was set. If the value of the counter equals the predetermined value X, then step 507 is performed, which resets the counter and the QF flag, and eventually, the process completes. If the value of the counter does not equal the predetermined value X then the dequeueing process is completed directly.

Figure 6:
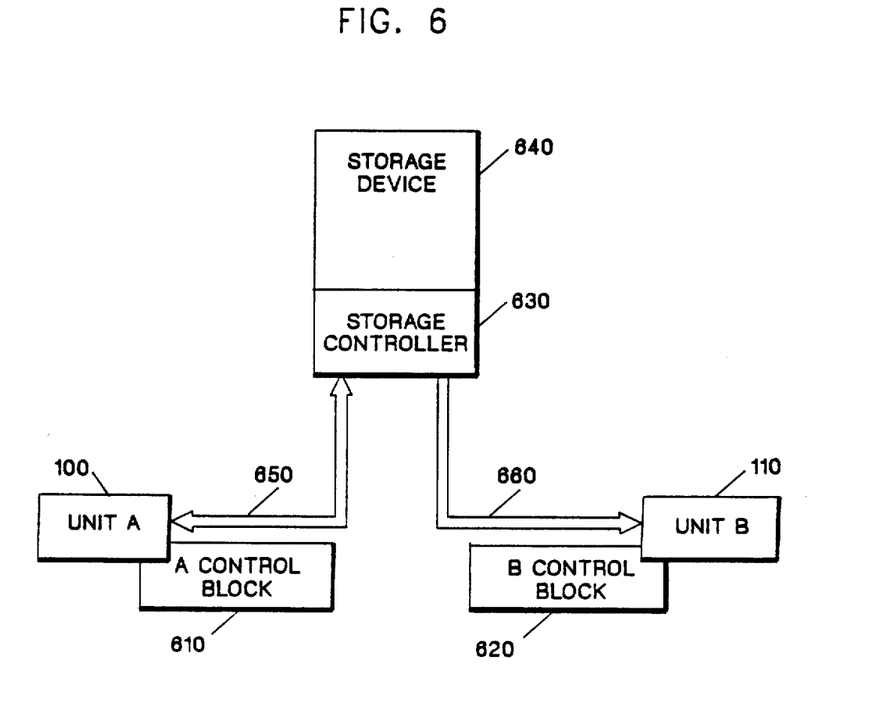
FIG. 6 is an overall view of a first illustrative embodiment of the invention.

FIG. 6 shows an overall view of an illustrative embodiment of the invention. Two communicating units, unit(A) 100 and unit (B) 110 share access to a storage device 640 through communication busses 650 and 660 attached to a storage controller 630. Each of the communication units A and B are attached to equivalent control blocks 610 and 620 capable of manipulating the storage queues via enqueue and dequeue operations. In the following, the communication path from unit A to unit B (A to B queue) will be discussed but it should be noticed that the same elements can be used to provide a communication path from unit B to unit A or different priority level communication paths, as will be described in FIGS. 10 and 11.

The number of communicating devices can be augmented as needed without requiring any modification of the described implementation. Then, each pair of communicating devices can implement as many paths (full-duplex if needed) between them as required by the application.

In the latter cases, the unique storage 640 houses the multiple queues.

Control blocks 610 and 620 are in charge of the following functions:
Control block 610 makes enqueues from A-B queue
Control block 620 makes dequeues from A-B queue.

Therefore, both control blocks 610 and 620 are totally independent. Control block 610 enqueues in A-B queue while control block 620 may dequeue from the same queue.

In the case where the foregoing elements are used to provide other queues, a B-A queue for instance, control blocks 610 and 620 will be in charge of the additional following functions.

Control block 610 makes dequeue from B-A queue
Control block 620 makes enqueue from B-A queue Thus, for a given queue, the enqueueing and dequeueing processes are managed separately and independently by control block 610 and 620. The sending unit A can enqueue without interfering with the receiving B while dequeueing information.

In the following, only the mechanisms involved in the manipulation of A-B queue communication path from unit A to unit B will be discussed.

Figures 7, 7A:
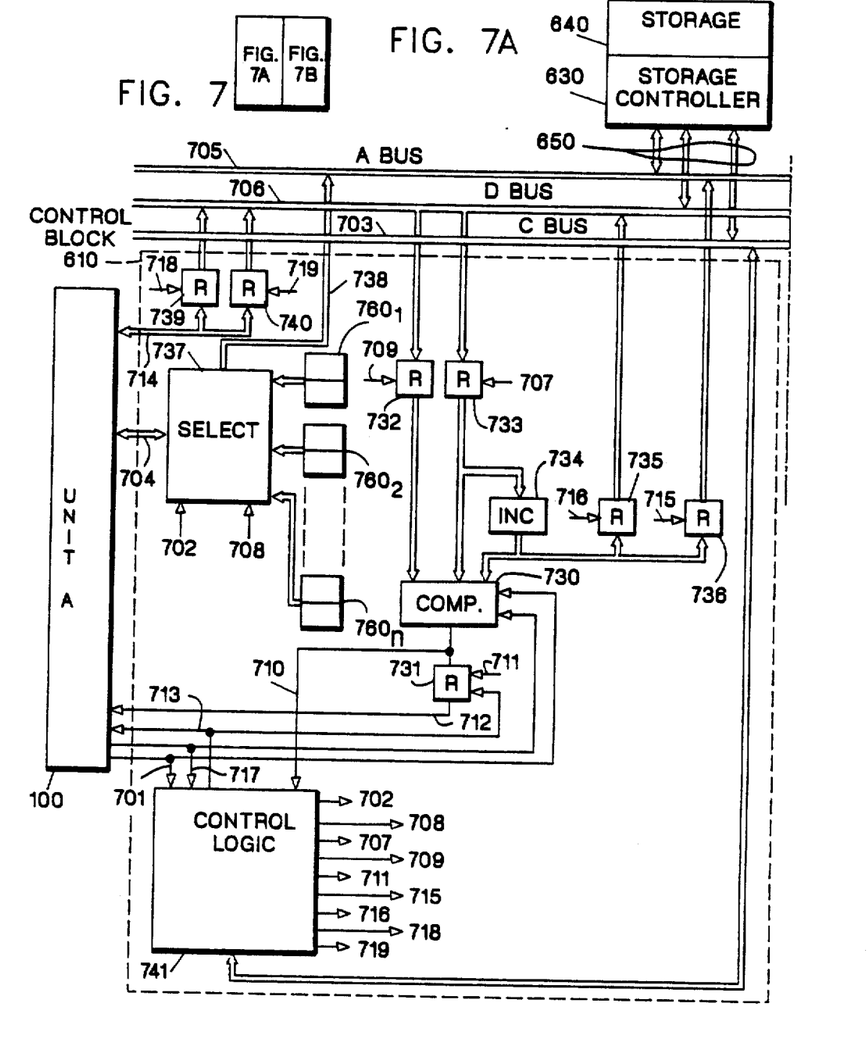
Figure 7B:
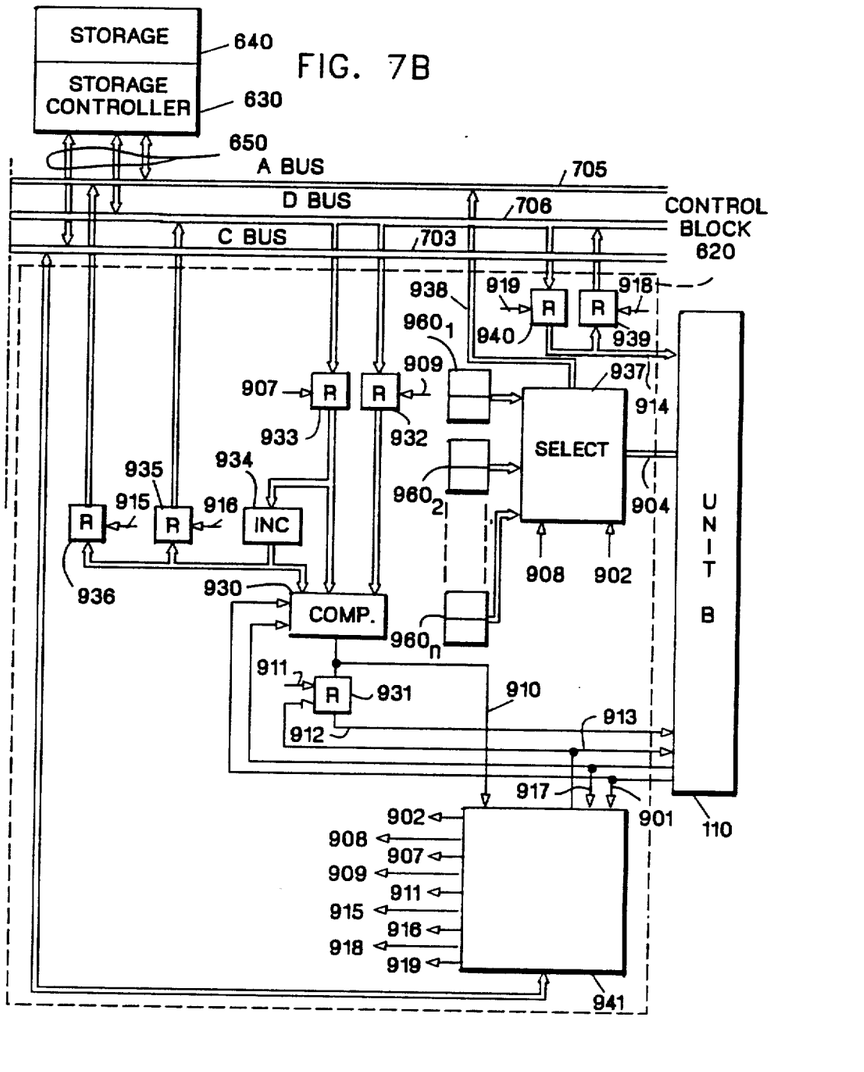

Referring to FIG. 7, which is composed of FIG. 7A and 7B, an illustrative embodiment of the present invention is described in detail.

For the sake of clarity, and to emphasize the essence of the invention, the following assumptions have been made.

It is assumed that control blocks 610 and 620 treat only one dequeue or enqueue command at a time, or, in other words, that each control block manipulates one queue at a time (the A to B queue in this case). If multiple queues must be managed simultaneously, additional control blocks such as control blocks 610 and 620 can be used.

The hysteresis handling as described in FIG. 5 will not be discussed in the following since the man knowledgeable in the art will easily adapt the following description to introduce the concept of hysterisis in the embodiment of the invention. The size of the WE is also assumed to be constant.

Both communication units 100 and 110 share bus 650 which includes an address bus 705, a data bus 706 and a control bus 703. Therefore, memory accesses via bus 650, through READ and WRITE operations are serialized for the purposes of this description, as will be described in FIG. 8. Control block 620 is not represented but is identical to control block 610 and is connected to bus 650 and to unit B (170).

Control block 610 includes a comparator 730, the output of which is connected to a register 731. Two registers 732 and 733 are connected to data bus 706 and to the two first inputs of comparator 730. The output of register 733 is connected to a INC 734 (incremental logic), the output of which is the third input of comparator 730. The output of INC 734 is also connected to the inputs of registers 735 and 736 which are respectively connected to data bus 706 and address bus 705. Control block 610 also includes a selector 737 bein to n bi-register 7601, 7602 ... 760n. Each n bit register 760i contains the values of Ai(E) and Ai(D) which correspond to the addresses of pointers E and D relating to the queue i (for example the indicia of A to B queue is 1, the indicia of B to A queue is 2, etc...). The value of a selected register Ai(E) or Ai(D) can be transmitted to address bus 705 via bus 738 via the selector 737. Registers 739 and 740 allow the communication of data between unit A 100 and data bus 706. All registers, selector 737, comparator 730, increment logic 734 are controlled by a control logic 741 as will be described here-below.

Control block 620 is identical to control block 610. It includes a comparator 930, the output of which is connected to n register 931. Two registers 932 and 933 are connected to data bus 706 and to the two first inputs of comparator 930. The output of register 933 is connected to a INCR 934 also connected to the inputs of registers 935 and 936 which are respectively connected to data bus 706 and address bus 705.

Control block 620 also includes a selector 937 being connected to n bit-register 9601,... 960n. Each n-bit-register 960i contains the values of Ai(E) and Ai(D) which correspond to the addresses of pointers E and D relating to the queue i. The value of n selected register Ai(E) or Ai(D) can be transmitted to address bus 705 via bus 938 and via the selector 937. Registers 939 and 940 allow the communication of data between unit B 110 and data bus 706. All registers, selector 937, comparator 930, INCR logic 934 are controlled by a control logic 941.

Enqueueing process into the A-B queue

Before any enqueueing or dequeueing process, an initialization sequence is required (IPL, power on or reset): for each queue i inside storage device 640, the two registers 760i (Ai(E) and Ai(D)) are filled in with the storage addresses of E and D pointers used to manipulate the i queue.

The enqueue operation starts with a request from unit A 100 which enables "enqueue —CMD" 701. As soon as "C_BUS" 703, part of the communication bus 650, indicates that the bus is available, control logic 741 raises lead "VALID A(E)" 702 which activates selector 737. The value "QUEUE_ID" carried on bus 704 is used by this selector to choose the proper Ai(E) register. When activated by "VALID A(E)" 702, selector 737 puts the contents of the chosen register Ai(E) 760i on "A_BUS" 705.

An appropriate command is put by the control logic 741 on "C_BUS" 703 to indicate a read operation. The storage device is selected and returns the read E value on "D_BUS" 706. When the "C_BUS" 703 indicates "D_BUS" 706 validity control logic 741 sets lead 707 on. This lead sets register 732. Now register 732 holds the E value.

When the "C_BUS" 703 indicates that the communication bus 650 is available, control logic 741 raises "VALID-A(D)" 708 which activates the selector 737. The value "QUEUE_ID" 704 is used by this selector to elect the proper Ai(D) register. When activated by "VALID-A(D)" 708, selector 737 puts the contents of the selected register Ai(D) 760i on "A_BUS" 705.

An appropriate command is put by the control logic 741 on "C_BUS" 703 to indicate a read operation. The storage device is selected and returns the read D value on "D BUS" 706. When "C_BUS" 703 indicates "D_BUS" 706 validity, control logic 741 sets the lead "LATCH-Rl" 709 on. This lead sets the register 733. Now register 733 holds the D value.

The following describes the different steps to perform the enqueue operation according to FIG. 4.

Step 401: INCR(E)=D?

Since lead "ENQUEUE-CMD" 701 is on, comparator 730 compares the output of register 733 with the output of the incrementation logic 734. Lead "COMPARATOR OUTPUT" 710 reflects the result of the comparison.

Step 402: WE is put in location INCR(E)

If the inputs of comparator 730 (output of register 733 and output of the incrementation logic 734) do not match, lead "COMpARATOR-OUTPUT" 710 is off.

The work element, placed by the communicating device on the "WE—BUS" 714 must be put in storage device at location INCR(E). When "C—BUS" 703 indicates that the communication bus is available, control logic 741 activates the lead "PUT_WE" 715 and the lead "ENQ-WE" 718 which enables driver 736 and Driver 739 respectively. Therefore, the output of the incrementation logic 734 is gated to "A—BUS" 705 and "WE BUS" 714 is gated to "D—BUS" 706. Control logic 741 indicates on the "C—BUS" 703 a write operation. The storage device is selected and stores the work element into storage and eventually the communication bus 650 is released.

E pointer is updated: E=INCR(E)

When "C—BUS" 703 indicates that the communication bus is available, control logic 741 starts the operation of updating the E pointer value. The leads "UPDATE_PTR" 716 and "VALID A(E)" 702 are activated. The new E value from incrementation logic 734 is put via driver 735 on "D—BUS" 706 and E address is put via selector output 738 on "A—BUS" 705. As soon as "C—BUS" 703 indicates the end of the memory update, Control logic 741 activates the lead "PROCESS-DONE" 713 to indicate the completion of the operation to the communicating device. As soon as lead "ENQUEUE-CMD" 701 is dropped by the communicating device, the enqueue operation ends.

Step 403: Q full is returned to the communicating device

If the inputs of comparator 730 (output of register 733 and output of the incrementation logic 734) match, the "COMPARATOR-OUTPUT" 710 is on. Control 731, lead "Q-FULL-EMPTY" 712 reflects to the communicating device the full state of that i queue. As soon as lead "ENQUEUE-CMD" 701 is dropped by communicating device 100, the control logic activates lead "PROCESS-DONE" 713 which resets register 731 and the enqueue operation ends.

Dequeueing process of the B-A Queue

As seen in the foregoing, the dequeueing process of the A to B queue is performed by control block 620. Similarly, control block 610 performs the dequeueing process of the B to A queue.

As pointed out above, the following operations imply as if that registers 960i are filled in with the values Ai(E) and Ai(D) during the initialization sequence.

E and D pointers acquisition.

When lead 'DEQUEUE-CMD"917 is raised by communicating device 100 to indicate a dequeue request, the dequeue operation starts. As soon as "C—BUS" 703, part of the communication bus 650, indicates that the bus is available, the control logic 941 raises lead "VALID-A(D)" 908 which activates selector 937. The value "QUEUE_ID" 904 is used by this selector to choose the proper Ai(D) register. When activated by "VALID-A(D) 908, the selector 937 puts the content of the selected register Ai(D) on the "A—BUS" 905.

An appropriate command is put by control logic 941 on "C—BUS" 703 to indicate a read operation. Storage device 640 is selected and returns the read D value on "D—BUS" 706.

When the "C—BUS" 703 indicates the D—BUS 706 validity, the control logic 941 makes the lead 907 on. This lead sets the register 932. Now register 932 holds the D value.

As soon as "C—BUS" 703 indicates that the communication bus 650 is available, the control logic 941 raises the lead "valid A(E)" 902 which activates the selector 937. The value "Queue_ID" 904 is used by this selector 937 to select the proper Ai(E) register 902, the selector 937 puts the content of the selected Ai(E) register on the "A—BUS" 705.

An appropriate command is put by the control logic 941 on the "C—BUS" 703 to indicate a read operation. The storage device is selected and returns the read E value on the "D BUS" 706. Then the "C—BUS" 703 indicates the "D—BUS" 706 validity, the control logic 941 makes the lead 909 on, this lead sets the register 933. Now register 933 holds the E value.

The following describes the different steps to perform the dequeue operation according to FIG. 3.

Step 301: E=D?

Since lead "DEQUEUE-CMD" 917 is on, comparator 930 compares the output of register 933 with the output of the register 932 and lead "COMPARATOR OUTPUT" 910 reflects the result of the comparison.

Step 303: WE is read from location INCR(D)

If the inputs of comparator 930 (register 933 and register 932) do not match, lead "COMPARATOR-OUTPUT" 910 is off. The work element must be read at address INCR(D) inside the storage device. When the "C—BUS" 703 indicates that the communication bus is available, the control logic 941 activates lead "PUT_WE" 915 which enables driver 936. Then, the output of incrementation logic 934 is placed on the "A—BUS" 705. The control logic 941 indicates a read operation on the "C—BUS" 703. Control logic 941 activates the lead "DEQ-WE" 919 which enables driver 740. Therefore, the contents of "D—BUS" 706 is placed on the "WE—BUS" 914.

D pointer is updated: D=INCR(D)

When "C—BUS" 703 indicates that communication bus 650 is available,i control logic 941 starts the operation of updating the D pointer value. Leads "UPDATE_PTR" 916 and "VALID" A(D)" 908 are activated. The new D value from incrementation logic is put via driver 935 on "D BUS" 706 and D address is put via selector output on "A—BUS" 705. As soon as "C_BUS" 703 indicates the end of the memory update, control logic 941 activates the lead "PROCESS-DONE" 913 to indicate the completion of the operation to the communicating device. As soon as the lead "DEQUEUE-CMD" 917 is dropped by the communicating device (the dequeued work element has been read from "WE BUS" 914 by the communicating device), the dequeue operation ends.

Step 302: Q empty is returned to communication device 900

If the I*puts of comparator 930 (registers 932 and 933) match, lead "COMPARATOR-OUTPUT" 910 is on. Control logic 941 raises lead 911 which sets register 931. The output of register 931, lead "Q-FULL-EMPTY" 912, reflects to the communicating device the empty state of that i queue. As soon as lead "DEQUEUE-CMD" 917 is dropped by the communicating device, control logic 941 activates lead "PROCESS-DONE" 913 which resets register 931 and the dequeue operation ends.

It should be noticed that control clocks 610 and 620 distinguish each other only in the fact that for a given queue i, one performs the enqueue operation and the other is in charge of the dequeue operation. Each element of control block 610, referenced 7XX, corresponds exactly to its equivalent element in control block 620 and which is referenced 9XX.

Figure 8:
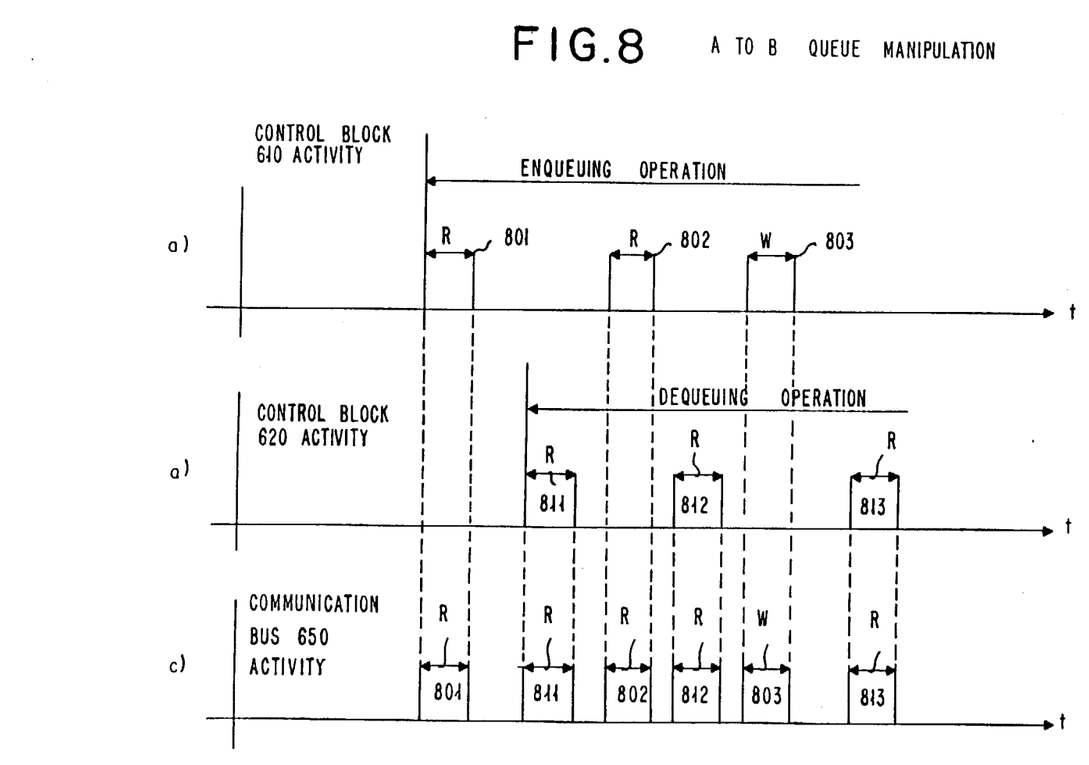
FIG. 8 shows examples of timing detailing the access of memory 640 through communication bus 650.

Referring to FIG. 8, examples of chronograms are shown detailing the access of storage 640 through control blocks 610 and 620 to perform parallel enqueue and dequeue operations.

Chronogram (a) relates to control block 610 communication with storage 640 while an enqueueing operation (in A to B queue). enqueueing operation includes sequences 801, 802 and 803. Sequence 801 is a "READ" (R) operation which corresponds, for instance, to the reading of the E value on "D_BUS" 706 before its storage into register 732 as described above. Similarly, sequence 802 corresponds to the reading of the D value on "D_BUS" 706 before its storage into register 733. Sequence 803 is the access to storage 640 to write the work element WE into the location INCR(E).

Chronogram (b) summarizes the access of control block 620 to storage 640 in a dequeue operation (A to B queue). This dequeueing operation includes sequences 811, 812 and 813. Sequence 811 is a "READ" operation which corresponds for instance, to the reading of the D value on "D_BUS" 706 before its storage into register 932. Similarly, sequence 812 corresponds to the reading of the E value on "D_BUS" before its storage into register 933. Sequence 813 is the access to storage 640 by control block 620 to read the work element from location INCR(D) into storage 640.

Chronogram (c) summarizes the access to communication bus 650 by control blocks 610 and 620. The read/write operations are serialized at the bus/storage level but enqueue/dequeue operations can be overlapped (reads and writes are interleaved) thus taking benefit from our proposed algorithm allowing enqueue and dequeue simultaneously on the same queue. No interlocking (implicit or explicit) is required.

Since the foregoing implementation considers a shared communication bus 650, memory accesses are serialized at the READ/WRITE elementary operations. That slight disadvantage involved by the straightforward but simple embodiment of the invention is easily avoided when considering a more sophisticated architecture.

Figures 9, 9A:
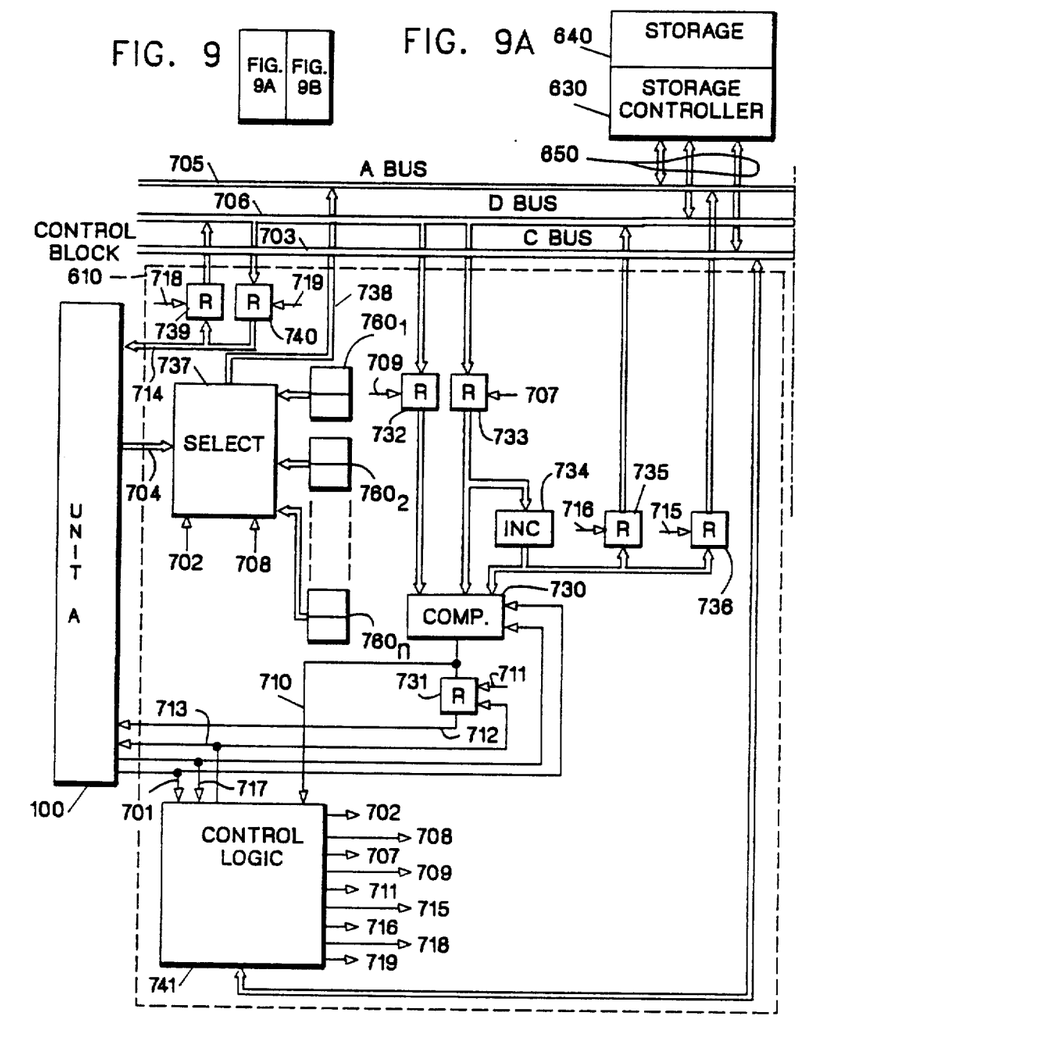
Figure 9B:
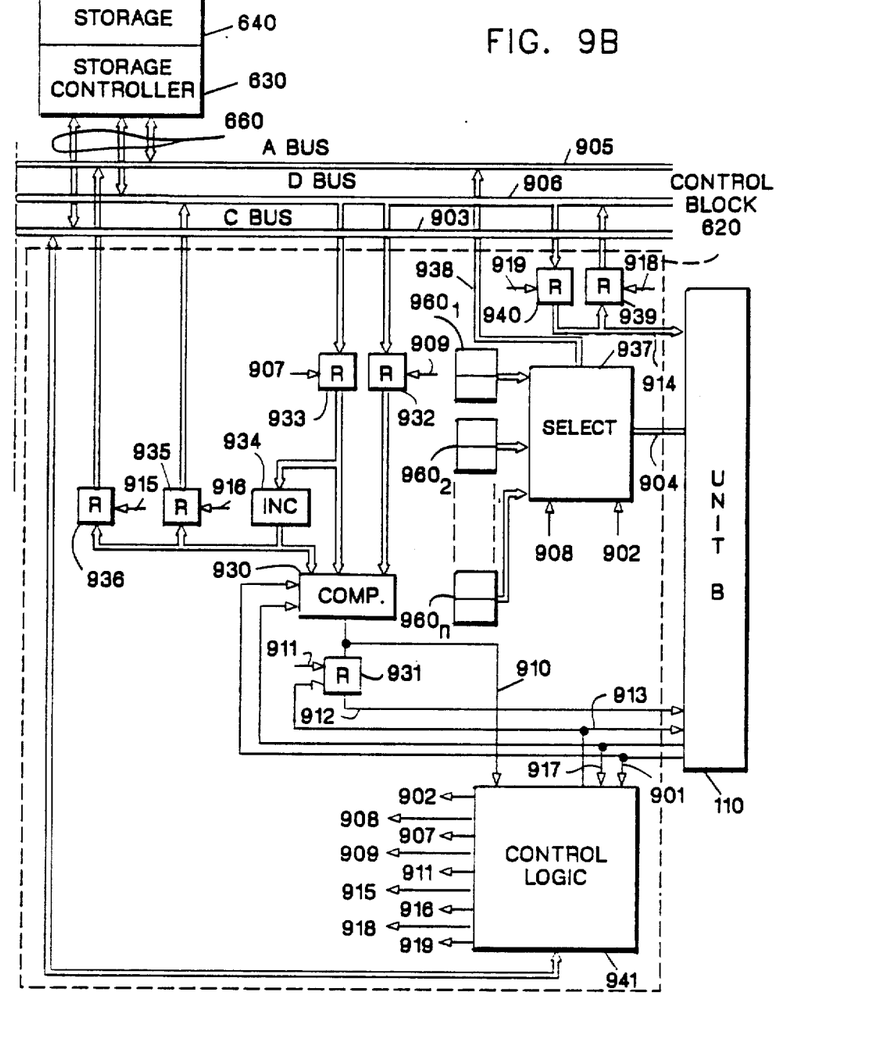

In respect to FIG. 9, which is composed of FIGS. 9A and 9B, a second more sophisticated embodiment of the invention is shown. The parallelism for READ/WRITE Access of the shared storage 640 is fully provided by using a multiple. busses structure and a multiple port memory 640. Communication unit A 100 access multiaccess memory 640 through control block 610 and a first communication bus 650. Similarly, communication unit B 110 accesses memory 640 through control block 620 and a second communication bus 660. Control blocks 610 and 620 are in charge of the following functions:

Control block 610 makes dequeues from B-A queue and makes enqueues to A-B queue.

Control block 620 makes dequeues from A-B queue and makes enqueues to B-A queues.

The enqueue/dequeue function involves the same operation as those detailed in the foregoing with respect to FIG. 6. For a given queue, A-B queue for instance, control blocks 610 and 620 can operate independently. As a matter of fact, the enqueue function involves steps 401, 402 and 404 (with respect of FIG. 4) which performs READ operations at addresses Ai(E), Ai(D) and WRITE operations for addresses INCR(E) and Ai(E). On the other hand, the dequeue function involves steps 301, 302, 303 and 304 (with respect to FIG. 3) which performs READ operations at addresses Ai(E), Ai(D) and INCR(D) and a WRITE operation at address Ai(D). Therefore no location in the storage can be addressed by control blocks 610 and 620 both performing a WRITE operation. No interference is possible between units 100 and 110 while enqueueing and dequeueing and no interlocking is involved.

Figure 10:
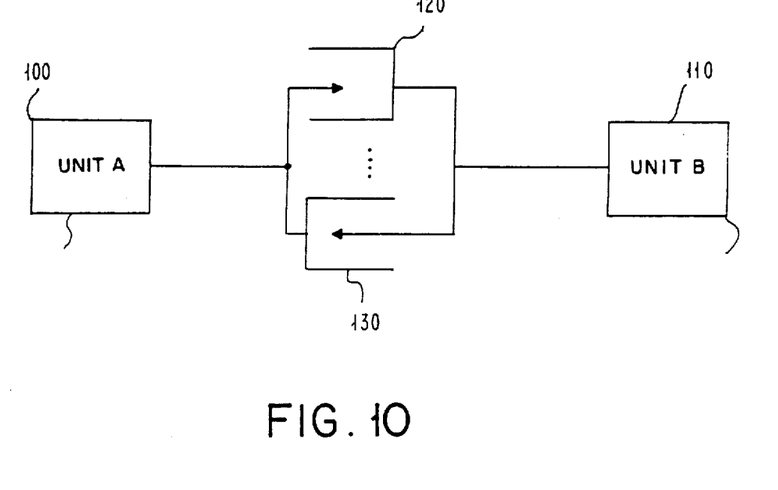
FIG. 10 shows the architecture using two queues providing a bidirectional path between two independent units.

Referring to FIG. 10, a bi-directional path is shown between two independent units: a unit (A) 100 and a unit B 110. A queue (one queue per one way path established between the two units) is provided to permit the communication between unit A 100 and unit B. A queue 120 allows the transmission of information from unit(A) 100 to unit 110 (B) and and a queue 130 allows the transmission from unit 110 (B) to unit 100 (A). Therefore a full duplex path between the two units requires two queues, one for each direction.

Figure 11:
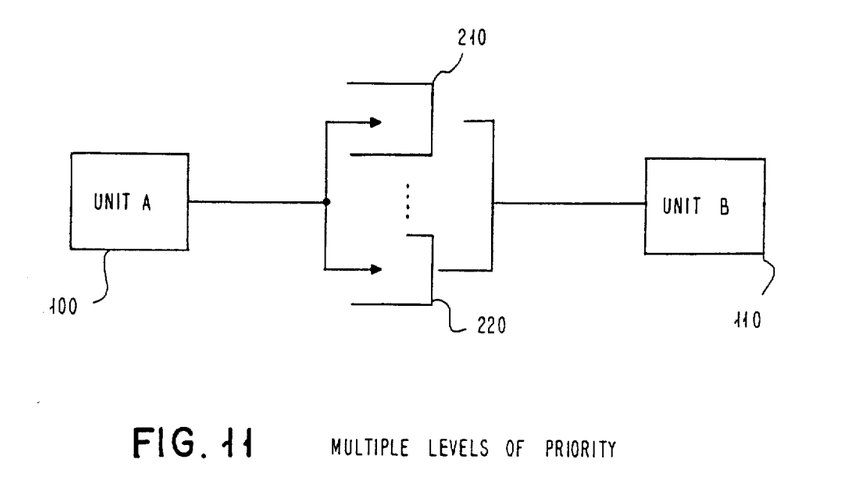
FIG. 11 shows the architecture providing a multi-priority level communication path.

Referring to FIG. 11, another way of combining elementary queues to provide multiple communication paths between units 100 and 110 is shown. Queues 210 and 220 allow multiple level of priority in the communication between the two units. For this purpose, the sender unit can specify a queue identifier indicating the desired level of priority.

Any sophisticated communication architecture can be provided by combining elementary. queues. It should be noticed that all the queues can be located in the same storage device 640 which can provide as many communication paths (between multiple couple of paired units) as required.

We claim:

1. A non-locking queuing mechanism for transferring information from a sending unit (100) to a receiving unit (110), through a queueing means (120) containing element areas located in a storage (640) in which said sending unit enqueues information elements and from which said receiving unit dequeues information elements, said mechanism being characterized in that it comprises:

a first pointer register for logging a first pointer (D) identifying the element area in said queuing means (120) where the last dequeues information element by said receiving unit (110), if any, was located;

a second pointer register for logging a second pointer (E) identifying the element area in said queuing means (120) where the last enqueued information element, if any, was located;

a first control block (610) activated by said sending unit (100) for enqueueing a first element following said last enqueued element into said queueing means (120), said enqueueing involving READ operations of said first and said second pointer register (D) (E) in order to determine whether the queue is full and if not full to determine the address of the location into said storage (640) where to enqueue said first element, said enqueueing further involving WRITE operations of said storage (640) in order to store said first element into said storage (640) and to update said second pointer register (E);

a second control block (620) activated by said receiving unit (110) for dequeueing a second element following said last dequeued element from said queuing means (120), said dequeueing involving READ operations of said first and said second pointer register (D) (E) in order to determine whether the queue is empty and if into empty to determine the address of the location into said storage (640) where to dequeue said second element, said dequeueing further involving a READ operation of said storage (640) in order to provide said second element ad a WRITE operation of said first pointer register (D) in order to update said first pointer (D);

whereby said enqueueing and said dequeueing is respectively performed by said first and said second control blocks (610), (620) without any locking mechanism.

2. A mechanism according to claim 1 characterized in that said first control block (610) further comprises:

a first incrementing means (734) receiving said second pointer register contents (E) and returning, when activated, a value identifying, in said queue means (120), the element area which follows that identified by said second pointer (E);

a first comparator (730) for comparing the value returned by said first incremented means (734) with said first pointer D;

means (735, 741) for logging the value returned by said first incrementing means into said second pointer register (E);

wherein said first control block (610) further
compares the value returned by said first incrementing means (734) with said first pointer (D) by said first comparator (730)and supplies to said sending unit (100) a signal indicating that said queueing means is full when said first comparator detects an equality and when said first comparator detects an unequality, said first control block places the information element supplied by said sending unit (100) into said queueing means (120) in the element area identified by the value returned by said first incrementing means (734)and logs said incremented returned value into said second pointer register;

second control block (620) further comprises
a second comparator (930) for comparing said first and second pointer values, a second incrementing means (934) receiving said first pointer register contents (D) and returning, when activated, a value identifying, in said queueing means (120), the element which follows that identified by said first pointer (D), and means (935, 941) for logging the value returned by said second incrementing means (934) into said first pointer register (D); wherein said second control block (620)
compares said first and second pointer by said second comparator (930)and supplying a signal to said receiving unit (110) indicating that the queueing means is empty when said second comparator (930) detects an equality, and when said second comparator (930) detects an unequality, activates said second incrementing means (934), and provides the information element identified by the value returned by said second incrementing means to said receiving unit (110), and —logs the value returned by said second incrementing means into said first pointer register (D).

3. A mechanism according to claim 2 characterized in that said first and second control block (610) and (620) are connected to said storage (640) and manage multiple queues between said sending unit (100) and said receiving unit (110) by providing as many pairs of first/second pointers (E, E) as there are queues.

4. A mechanism according to claim 2 characterized in that said first and second control block (610) and (620) connected to said storage (640) manage a first (A-B) and second (B-A) queue between said two units (100) (110) providing a full duplex path between said two units (100) (110), said first control block (610) makes enqueues from said first queue (A-B) and dequeues from said second queue (B-A)

said second control block (620) makes dequeues from said first queue (A-B) and enqueues from said second queue (B-A).

5. A mechanism according to claim 3 or claim 4 characterized in that:

said storage (640) is a multiple port memory having at least a first communication bus (640) and a second communication bus (660);

said first control block (610) enqueues said information element into said queuing means (120) by addressing said storage (640) through said first communication bus (640);

said second control block (620) dequeues said information element into said queuing means (120) by addressing said storage (640) through said second communication bus (660).

6. A mechanism according to claim 1 or 2 or 3 or 4, characterized in that it comprises a hysteresis mechanism for avoiding too much swapping of said queuing means form full to non-full states.

7. A mechanism according to claim 5 characterized in that it comprises a hysteresis mechanism for avoiding too much swapping of said queuing means from full to non-full states.

* * * * *